US011944036B2

(12) United States Patent
Heitmann et al.

(10) Patent No.: US 11,944,036 B2
(45) Date of Patent: Apr. 2, 2024

(54) FORAGE HARVESTER (71) Applicant: CLAAS Selbstfahrende Erntemaschinen GmbH, Harsewinkel (DE)

(72) Inventors: Christoph Heitmann, Warendorf (DE); Sven Carsten Belau, Gütersloh (DE); Ingo Bönig, Gütersloh (DE); Jan Meyer zu Hörste, Bad Rothenfelde (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 281 days.

(21) Appl. No.: 17/470,151

(22) Filed: Sep. 9, 2021

(65) Prior Publication Data
US 2022/0071091 A1 Mar. 10, 2022

(30) Foreign Application Priority Data

Sep. 9, 2020 (DE) .......................... 102020123526.7

(51) Int. Cl.
A01D 43/08 (2006.01)
A01D 82/02 (2006.01)
(52) U.S. Cl.
CPC ........... *A01D 43/085* (2013.01); *A01D 82/02* (2013.01)
(58) Field of Classification Search
CPC ............................. A01D 43/085; A01D 82/02
See application file for complete search history.

(56) References Cited

U.S. PATENT DOCUMENTS

2012/0185140 A1 7/2012 Kormann
2019/0261559 A1 8/2019 Heitmann et al.
(Continued)

FOREIGN PATENT DOCUMENTS

DE 102018104287 A1 * 8/2019 .......... A01D 41/127
DE 102018104287 A1 8/2019
(Continued)

OTHER PUBLICATIONS

European Search Report for European application No. 21189038. 9-1004 dated Jan. 27, 2022.

*Primary Examiner* — Abigail A Risic
(74) *Attorney, Agent, or Firm* — Lempia Summerfield Katz LLC (57) ABSTRACT A forage harvester with at least one work assembly is disclosed. The forage harvester has a corn cracker to process grain components and a driver assistance system. The driver assistance system controls the corn cracker by adjusting the machine parameters of the corn cracker. In particular, the driver assistance system has an optimization model which includes a multidimensional characteristic map that represents a relationship between a processing quality of the grain components and at least three parameters that comprise an input parameter representing a current harvesting process state and at least one machine parameter of the corn cracker as an output parameter. Thus, the driver assistance system determines the output parameter in the control routine during the harvesting process based on the varying input parameter from the optimization model and adjusts it in the corn cracker to achieve a uniform given processing quality of the grain components during the harvesting process.

20 Claims, 2 Drawing Sheets (56) References Cited

U.S. PATENT DOCUMENTS

| | | |
|---|---|---|
| 2019/0261561 A1 | 8/2019 | Heitmann |
| 2019/0343044 A1* | 11/2019 | Bormann .............. A01D 41/141 |
| 2020/0128735 A1* | 4/2020 | Bonefas ................ A01D 82/00 |
| 2022/0046854 A1* | 2/2022 | Pickett ................. A01D 41/127 |
| 2022/0061216 A1* | 3/2022 | Heitmann .............. G06V 20/59 |
| 2022/0217905 A1* | 7/2022 | Murray ................ A01D 43/086 |
| 2023/0060670 A1* | 3/2023 | Lehmann ............. A01D 41/127 |
| 2023/0180662 A1* | 6/2023 | Palla .................... A01D 41/127 |
| | | 56/10.2 R |

FOREIGN PATENT DOCUMENTS

| | | | | |
|---|---|---|---|---|
| DE | 102018104289 A1 | | 8/2019 | |
| DE | 102019108472 A1 * | | 10/2020 | |
| EP | 2361495 A1 | | 8/2011 | |
| EP | 2605200 A1 * | | 6/2013 | ............ G06Q 10/06 |
| EP | 3530102 A1 | | 8/2019 | |
| EP | 3646703 A1 | | 5/2020 | |

\* cited by examiner

FORAGE HARVESTER

CROSS REFERENCE TO RELATED APPLICATION

This application claims priority under 35 U.S.C. § 119 to German Patent Application No. DE 102020123526.7 filed Sep. 9, 2020, the entire disclosure of which is hereby incorporated by reference herein.

TECHNICAL FIELD

The invention relates to a forage harvester and a method for operating a forage harvester, the forage harvester configured to perform a harvesting process.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Forage harvesters harvest a crop from a field and process the harvested material thus obtained by using a series of work assemblies. One application of foraging harvesters is the harvesting of corn. With this type of harvesting, frequently the entire corn plant including the corncob is collected and chopped up using the forage harvester. The harvested material obtained in this manner may be used to feed livestock, especially ruminants. An alternative possible application is the use in biogas plants.

When the harvested material is used as feed for animals and when used in biogas plants, the grain components of the harvested material should be cracked (e.g., comminuted). Specifically, the grain components should be cracked so that the starch contained therein becomes accessible and is not shielded by the husk of the grain component. The cracking of grain components may be accomplished on the one hand by chopping up the harvested material and on the other hand substantially by a corn cracker of the forage harvester. The corn cracker may be adjusted so that all grain components are reliably or consistently comminuted; however, such an adjustment may consume an unnecessary amount of energy or fuel. This unnecessarily high consumed energy therefore cannot be converted into an increase in the driving speed resulting in a system-related, correspondingly reduced output per area.

EP 2 361 495 A1 discloses a forage harvester with at least one work assembly that may be adjusted with machine parameters. Specifically, the corn cracker is a work assembly that has two rollers, each rotating during operation, with machine parameters of an adjustable rotational speed of the rollers, a gap with an adjustable gap width between the rollers, and the rollers have an adjustable differential rotational speed. In this case, a user may specify a desired processing quality of the grain components. In order to achieve this, a driver assistance system of the forage harvester correspondingly adjusts the gap width of the corn cracker. This adjustment of the gap width is based on a chaff length. The gap width adjusted based on the chaff length is then corrected depending on the moisture of the harvested material.

BRIEF DESCRIPTION OF THE DRAWINGS

The present application is further described in the detailed description which follows, in reference to the noted drawings by way of non-limiting examples of exemplary implementation, in which like reference numerals represent similar parts throughout the several views of the drawings, and wherein.

DETAILED DESCRIPTION

As discussed in the background, the driver assistance system of the forage harvester adjusts the gap width of the corn cracker based on a chaff length, with the gap width (adjusted based on the chaff length) then being corrected depending on the moisture of the harvested material. Such a sequential consideration of the chaff length and moisture to adjust the gap width works only if the chaff length, the moisture, and the gap width are considered. If, however, other parameters that vary during the harvesting process and other manipulated variables in the form of machine parameters are considered, the sequential adjustment is limiting. In order to circumvent these limits, the known forage harvester uses optical recognition of the processing quality of the grains, and then correspondingly regulates the gap width. However, this optical recognition is expensive and time-consuming.

Thus, in one or some embodiments, a method and apparatus are disclosed in which a forage harvester enables adjustment of the processing quality of the grain components more effectively and precisely.

The forage harvester is configured to perform a harvesting process with at least one work assembly for harvesting a crop and/or for processing harvested material of the crop in the harvesting process, with the harvested material comprising grain components and with the at least one work assembly being adjustable with machine parameters. One type of work assembly comprises a corn cracker configured to process the grain components thereby comminuting the harvested material during operation. The corn cracker has at least two rollers that rotate during operation and a gap between the rollers through which the harvested material is transported. In this regard, the corn cracker has a plurality of machine parameters, including any one, any combination, or all of: an adjustable rotational speed of one or both of the rollers; an adjustable gap width between the rollers; and an adjustable differential rotational speed by which the rotational speed of the rollers differs.

Thus, one consideration is to control the corn cracker using an improvement or an optimization model based on a multidimensional characteristic map. In one or some embodiments, "multidimensional" means that at least three parameters (three or more parameters) are considered jointly. Alternatively, "multidimensional" means that at least four parameters (four or more parameters) are considered jointly.

Whereas a sequential adjustment based on the harvested material moisture may yield positive results when adjusting the gap width based on the chaff length and the harvested material moisture, the advantages of multidimensional characteristic map control with several parameters are present. Since one parameter and then the next and so on are not considered, the interdependencies of the parameters may be considered when controlling so that a global optimum may be found.

In particular, in one or some embodiments, a driver assistance system is disclosed and configured to control at least one aspect of the corn cracker using a control routine.

In particular, the driver assistance system, using the control routine, is configured to cause the adjustment (e.g., via one or more commands to the corn cracker) of the machine parameters (e.g., any one, any combination, or all of: an adjustable rotational speed of one or both of the rollers; an adjustable gap width between the rollers; and an adjustable differential rotational speed by which the rotational speed of the rollers differs) of the corn cracker. For example, the driver assistance system has an optimization model, with the optimization model having at least one multidimensional characteristic map that represents a relationship between a processing quality of the grain components and at least three parameters, the at least three parameters comprising at least one input parameter representing a current harvesting process state and at least one machine parameter (e.g., any one, any combination, or all of: an adjustable rotational speed of one or both of the rollers; an adjustable gap width between the rollers; and an adjustable differential rotational speed by which the rotational speed of the rollers differs) of the corn cracker as an output parameter. In practice, the at least one input parameter varies during the harvesting process, with the driver assistance system determining the output parameter (e.g., a specified value for the output parameter which may affect the processing quality of the grain components during the harvesting process) in the control routine during the harvesting process responsive to and based on the varying input parameter from the optimization model. In response to determining the output parameter (such as the value for the output parameter), the driver assistance system is configured to cause the change to the determined value for the output parameter (such as via one or more commands) thereby causing the adjustment of the machine parameter(s) in the corn cracker and in turn achieving a predetermined processing quality (e.g., a uniform given processing quality) of the grain components during the harvesting process.

Another advantage of the disclosed forage harvester and method is accordingly that a uniform processing quality may be ensured during the harvesting process even under varying boundary conditions. These varying boundary conditions may be determined by the field, the crop or actions of a user. The latter holds true because the user may be aware of many other parameters and boundary conditions in addition to the processing quality in a forage harvester and cannot focus all of his activities on the corn cracker.

In one or some embodiments, various inputs/outputs are considered for the optimization model. As discussed above, in one or some embodiments, the optimization model has at least one multidimensional characteristic map that represents a relationship between a processing quality of the grain components and at least three parameters. The at least three parameters may comprise input parameters, output parameters or both. In particular, in one or some embodiments, the least three machine parameters may comprise at least two machine parameters as input parameters, such as at least three machine parameters as input parameters, or such as at least four machine parameters as input parameters representing a current harvesting process state, and/or the at least three parameters comprise at least two machine parameters as output parameters, or such as at least three machine parameters as output parameters. In this way, at least three machine parameters, such as more than three parameters, may be represented by the multidimensional characteristic map.

In one or some embodiments, the work assembly(ies) on the forage harvester may be adjusted by machine parameters. Merely by way of example, any one, any combination, or all of the following may be performed: the forage harvester has pre-pressing rollers as a work assembly with an adjustable rotational speed as a machine parameter through which a chaff length of the harvested material can be adjusted; the forage harvester has a motor as a work assembly with an adjustable rotational speed as a machine parameter for driving the forage harvester and for supplying the energy to at least one of the additional work assemblies; the forage harvester has an attachment as a work assembly for picking up the crop; the forage harvester has a cutter head as a work assembly for chopping up the harvested material; the forage harvester has a moisture sensor (e.g., an near infrared (NIR) sensor) for generating data indicative of harvested material moisture (for later determination of harvested material moisture); or the forage harvester has a throughput sensor for determining harvested material throughput. Further, the multidimensional characteristic map may be configured as one or more input parameters or one or more output parameters for one or more of the adjustable rotational speed of the pre-pressing rollers, the adjustable rotational speed of the motor, the harvested material moisture, or the harvested material throughput.

Various input parameters to the multidimensional characteristic map are contemplated. In one or some embodiments, the input parameters comprise any one or both of: harvested material parameters (e.g., sensed harvested material parameters); or machine parameters influencing the processing quality. For example, the input parameters may comprise any one, any combination, or all of: the chaff length, the rotational speed of the pre-pressing rollers; the harvested material moisture; the motor rotational speed; or the harvested material throughput.

In one or some embodiments, various output parameters to the multidimensional characteristic map are contemplated. By way of example, the output parameters may comprise one or both of: one or more machine parameters of the corn cracker; or the machine parameters influencing the processing quality. For example, the output parameters may comprise any one, any combination, or all of: the gap width of the corn cracker; the differential speed of the roller(s) of the corn cracker; or the differential rotational speed of the corn cracker. In this way, the combination of several of these input parameters and output parameters, various advantages of multidimensional characteristic map control may be represented in a various embodiments.

In one or some embodiments, the at least one input parameter may vary during the harvesting process, and the driver assistance system may be configured to determine the output parameter in the control routine during the harvesting process responsive to and based on the varying input parameter from the optimization model, and to adjust it to achieve a predetermined processing quality (such as constant processing quality) of the grain components during the harvesting process. In this way, predetermined processing quality (such as constant processing quality) may be achieved. The processing quality may be actively enhanced/improved or reduced. In particular, in the latter case (of reduction in processing quality), the released energy may be exploited to increase the driving speed.

In one or some embodiments, the multidimensional characteristic map may also represent a relationship between any one, any combination, or all of: a driving speed of the forage harvester; an output per area of the forage harvester; or energy consumption (e.g., fuel consumption of the forage harvester) and the at least three parameters. In this way, additional advantages of multidimensional characteristic map control may be achieved responsive to the multidimensional characteristic map also considering other aspects, such as any one, any combination, or all of: driving speed of the forage harvester; output per area of the forage harvester; or energy consumption of the forage harvester.

In one or some embodiments, the driver assistance system is configured to perform multi-objective optimization with several objectives based on the optimization model in the control routine. For example, in multi-objective optimization, one objective is the specified processing quality and one objective is a minimum energy consumption, and/or maximum driving speed, and/or a maximum output per area, and the driver assistance system is configured to determine the output parameter optimized based on multi-objective optimization in the control routine during the harvesting process based on the varying input parameter. In this way, multi-objective optimization may be performed with respect to the given processing quality on the one hand and the minimum energy consumption, and/or maximum driving speed, and/or the maximum output per area on the other hand.

In one or some embodiments, the objectives of multi-objective optimization are weighted. In particular, the weighting of the objectives (such as any one, any combination, or all of the specified processing quality, the minimum energy consumption, the maximum driving speed, or the maximum output per area) may be specified by a user. For example, the user may adjust the weighting between the processing quality, and/or the minimum energy consumption, and/or the maximum driving speed, and/or the maximum output per area to a graphic (such as a slider), with the graphic visualizing the interplay or competition between the processing quality, and/or the minimum energy consumption, and/or the maximum driving speed, and/or the maximum output per area. In this way, the driver assistance system may output (such as along with the graphic in a graphical user interface (GUI)) suggested weighting of the multiple objectives through which to better achieve the multiple objectives in the multi-objective optimization. Through the GUI, the user may specify the weighting between the competing variables. Accordingly, the decision on the use of the degrees of freedom obtained by the multidimensional characteristic map may be provided to the user.

In one or some embodiments, the driver assistance system, based on multi-objective optimization, may make suggestion(s) to the user with respect to any one, any combination, or all of: the specified processing quality; the adjustment of machine parameters; or the weighting of the objectives with which objectives can be better achieved in multi-objective optimization, and in one embodiment, these suggestions may deviate from the user specifications. In this way, the driver assistance system may propose to the user potential changes to the adjustments of the forage harvester based on multi-objective optimization. This considers that smaller changes in the adjustments of the forage harvester may be easily analyzed by the multidimensional characteristic map. If major improvements are achievable using these small changes, it may be advantageous to suggest them to the user.

In one or some embodiments, the multidimensional characteristic map has at least one two-dimensional characteristic and/or at least one multidimensional characteristic, such as at least some of the characteristics are based on measured relationships, and/or at least some of the characteristics are based on theoretical relationships, such as at least some of the characteristics are based on relationships that the user has measured at a location in the past relating to the current harvesting process.

In one or some embodiments, the driver assistance system is configured to adapt the multidimensional characteristic map during the ongoing harvesting process, such as cyclically, to the current harvesting process state. In particular, the driver assistance system has at least one initial characteristic map and, in the first determination of the at least one output parameter, the driver assistance system undertakes the determination based on the initial characteristic map. Further, the multidimensional characteristic map may represent at least one relationship between a control parameter representing the current harvesting process state and at least one of the least three parameters. The driver assistance system may adapt the multidimensional characteristic map to the current harvesting process state based on the relationship between the control parameter and the at least three parameters, such as the driver assistance system saving the adapted multidimensional characteristic map for use in later harvesting processes. In this way, the characteristic map may be adapted based on the current harvesting process state. The characteristic map is necessarily based on a few assumptions that do not always have to be completely true in the specific harvesting process. The possibility of transferring such feedback to the characteristic map is advantageous over a simple regulation since this accordingly alters the theoretical basis for decision-making instead of pursuing decision-making with only measured values that are always on the wrong theoretical basis. This version is also less fluctuation-prone in comparison to a regulation.

In one or some embodiments, the driver assistance system is configured to redetermine the output parameter in the control routine and adjust it in the corn cracker during the harvesting process cyclically or at responsive to determining that there is a change (such as a specified deviation) from the optimization model in any one, any combination, or all of the following: the harvested material throughput; the motor rotational speed; the harvested material moisture; or the chaff length from the optimization model. In this way, certain changes in the harvesting process may result in new adjustments of the corn cracker.

In one or some embodiments, a method for controlling a forage harvester is disclosed. Any one, any combination, or all of the steps described above may be performed in the disclosed method.

Figure 1:
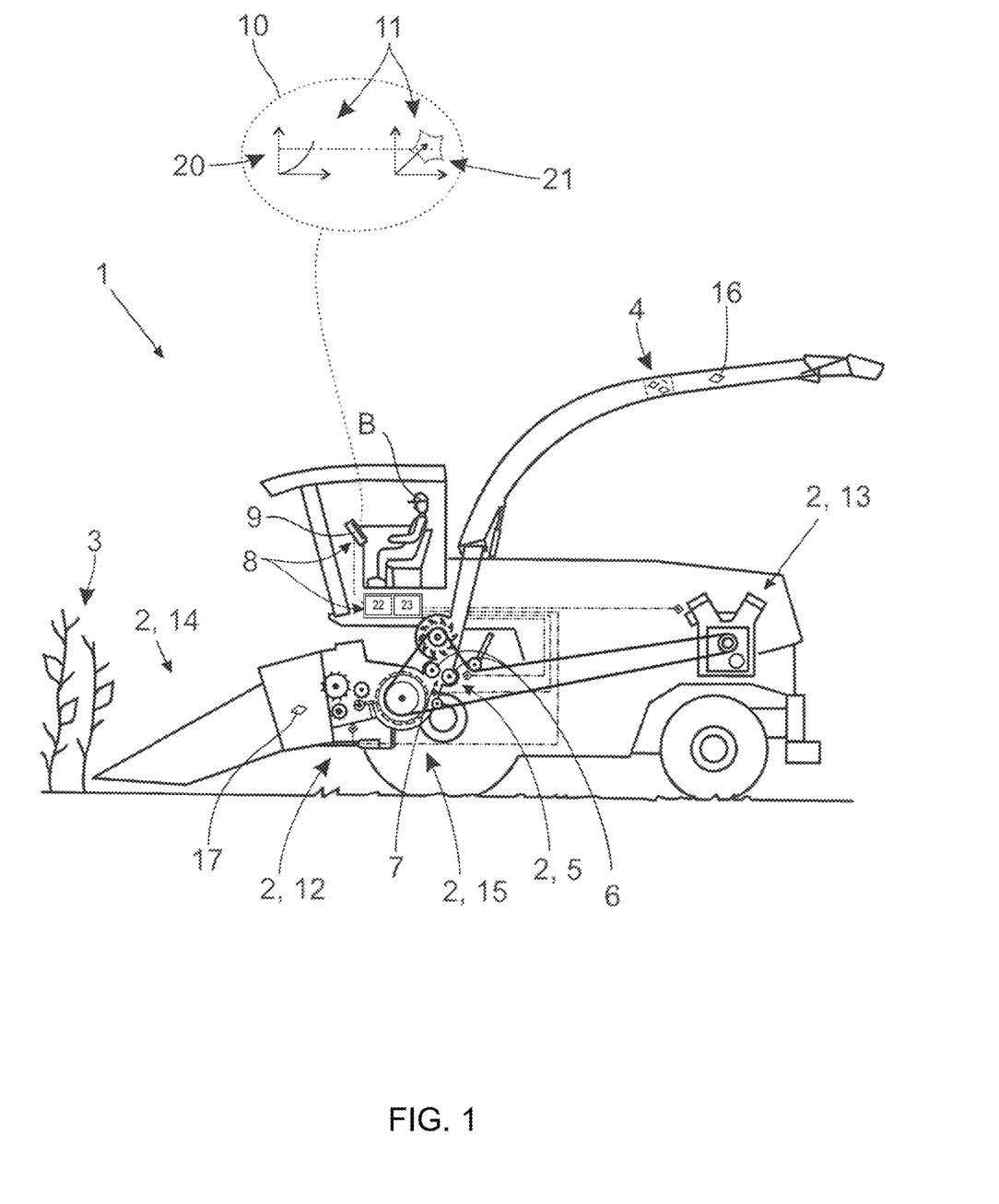
FIG. 1 illustrates a disclosed forage harvester.

Referring to the figures, the forage harvester 1 shown in FIG. 1 serves to perform a harvesting process and has at least one work assembly 2 for harvesting a crop 3 and/or for processing harvested material 4 of the crop 3 in the context of the harvesting process. In one or some embodiments, the crop 3 is corn plants. In principle, the forage harvester 1 harvests the crop 3. Alternatively, or in addition, the forage harvester 1 may only pick up crop 3 that has already been harvested. The crop 3 obtained in this manner may then be processed by the forage harvester 1, such as chopped up.

The harvested material 4 comprises grain components and non-grain components. The grain components may be corn grains from the corn plants. The non-grain components may then be leaves, stems and the like from the corn plant.

The at least one work assembly 2 may be adjusted with one or more machine parameters. The functioning of the work assembly 2 may be greatly influenced using the adjustment of the one or more machine parameters. The machine parameters may be various conceivable functional parameters of the work assembly 2. The machine parameters may be very specific, for example relating to a flow, or more general, a driving route of the forage harvester 1. The term "machine parameter" is therefore to be understood broadly.

The forage harvester 1 has a corn cracker 5 as a work assembly 2 for processing the grain components. During operation, the corn cracker 5 comminutes the harvested material 4. The corn cracker 5 has at least two rollers 6 that rotate during operation with an adjustable rotational speed as a machine parameter. A gap 7 may be present between the rollers 6 with a gap width that may be adjusted as a machine parameter. The harvested material 4 is transported through the gap 7 while the forage harvester 1 is operating. The rollers 6 have a differential adjustable rotational speed as a machine parameter by which the rotational speed of the rollers 6 differs. Given the differential rotational speed of the rollers 6, the grain components transported through the gap 7 between the rollers 6 are comminuted by the rollers 6. To achieve a maximum or optimal comminuting and accordingly a high processing quality of the grain components, the gap width may be adjusted (such as to a minimum). However, this adjustment may use more energy of the forage harvester 1 than necessary, with the energy then not being available for potentially increasing the driving speed.

The forage harvester 1 has a driver assistance system 8 for actuating at least one of the work assemblies 2 (e.g., send one or more control commands to the work assemblies 2 in order to change operation of the work assemblies 2). The driver assistance system 8 may control various work assemblies 2 of the forage harvester 1, interact with a user B, and generally serve to control various aspects of the forage harvester 1. The driver assistance system 8 has a terminal 9 for communicating with the user B. Via this terminal 9, the user B may specify various user specifications for the driver assistance system 8.

In one or some embodiments, the driver assistance system 8 may comprise any type of computing functionality, such as at least one processor 22 (which may comprise a microprocessor, controller, PLA, or the like) and at least one memory 23 in order to perform the disclosed analysis and control of the various work assemblies, and/or any other processing disclosed herein. The memory may comprise any type of storage device (e.g., any type of memory). Though the processor 22 and memory 23 are depicted as separate elements, they may be part of a single machine, which includes a microprocessor (or other type of controller) and a memory.

The processor 22 and memory 23 are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

The driver assistance system 8 may control at least the corn cracker 5 in a control routine in that the driver assistance system 8 adjusts the one or more machine parameters of the corn cracker 5.

The driver assistance system 8 may include an optimization model 10. In one or some embodiments, the optimization model 10 has at least one multidimensional characteristic map 11 that represents a relationship between a processing quality of the grain components and at least multiple parameters, such as three parameters. With respect to the definition of the multidimensional characteristic map 11, reference is made to the previous discussion in the description.

The at least three parameters relate to the forage harvester 1 and/or the harvesting process, but they may otherwise be chosen relatively arbitrarily. In one or some embodiments, all of at least three parameters have at least a certain influence on the processing quality of the grain components. The at least three parameters comprise at least one input parameter representing a current harvesting process state, and at least one machine parameter of the corn cracker 5 as an output parameter. The third parameter may then be another input parameter or another output parameter. In one or some embodiments, the input parameter may be considered set with respect to the optimization model 10, whereas the processing quality of the grain components may be influenced using the output parameter.

Further, in one or some embodiments, the at least one input parameter varies during the harvesting process, and the driver assistance system 8: determines the output parameter in the control routine during the harvesting process based on the varying input parameter from the optimization model 10; and adjusts the input parameter in the corn cracker 5 to achieve a uniform, predefined processing quality of the grain components during the harvesting process. Since various boundary conditions of the harvesting process may fluctuate during the harvesting process, the driver assistance system 8 accordingly may adapt the corn cracker 5 to the current conditions.

In one or some embodiments, the term "control" may refer to controlling in a narrow sense. Controlling and not regulation is therefore contemplated. In this case, the situation may even be such that the processing quality of the grain components is not detected by sensors. At least however the processing quality of the grain components is not regulated. Only a yet to be explained change in the characteristic map 11 permits incorporating a certain amount of feedback into controlling.

The term "harvesting process state" is to be understood broadly. These may also be internal states of the forage harvester 1 during the harvesting process to the extent that they somehow relate to the processing of the harvested material 4, picking it up, or the harvesting process in general.

It also contemplated that not just three machine parameters, but also at least four machine parameters, at least five machine parameters, at least six machine parameters, or at least seven machine parameters are considered in the characteristic map 11. All statements with respect to the at least three machine parameters correspondingly apply to the at least four machine parameters, at least five machine parameters, at least six machine parameters, or the at least seven machine parameters.

In one or some embodiments, the at least three machine parameters comprise at least two input parameters, such as at least three input parameters, or such as at least four input parameters representing a current harvesting process state. In addition or alternatively, the at least three parameters may comprise at least two machine parameters, such as at least three machine parameters as output parameters. The parameters are explained further below.

The forage harvester 1 shown in FIG. 1 may have pre-pressing rollers 12 as a work assembly 2 with an adjustable rotational speed as a machine parameter. A chaff length of the harvested material 4 may be adjusted using this rotational speed. The forage harvester 1 may additionally or alternatively have a motor 13 as a work assembly 2 with an adjustable rotational speed as a machine parameter for driving the forage harvester 1 and for supplying the energy to at least one of the additional work assemblies 2. Moreover, the forage harvester 1 may have an attachment 14 as a work assembly 2 for picking up or collecting of the crop 3. In one or some embodiments, the picking up or collecting may comprise harvesting. The forage harvester 1 may also have a cutter head 15 as a work assembly 2 for chopping up the harvested material 4. Since the cutter head 15 is frequently coupled directly to the motor 13 of the forage harvester 1, the chaff length may be substantially adjustable only via the pre-pressing roller 12 without changing the motor rotational speed. Other arrangements are however also possible. Correspondingly, it may also be provided that the chaff length is only secondarily adjustable via the pre-pressing roller 12.

The forage harvester 1 may have a moisture sensor 16, such as an NIR sensor (i.e., a near infrared sensor), for determining harvested material moisture. The forage harvester 1 may also have a throughput sensor 17 for determining harvested material throughput.

The input parameters may comprise harvested material parameters, such as sensed harvested material parameters. In one or some embodiments, the harvested material parameters are all the data, such as measured data, that directly relate to the harvested material 4. In addition or alternatively, the input parameters may comprise the machine parameters influencing or affecting processing quality. These are all the settings in the work assemblies 2 of the forage harvester 1 with which influence is exerted on the processing quality. This may also comprise machine parameters that are not directly adjustable by the user B.

In one or some embodiments, the input parameters comprise any one, any combination, or all of: the chaff length; the rotational speed of the pre-pressing rollers 12; the harvested material moisture; the motor rotational speed; or the harvested material throughput. Precisely these input parameters have a particularly relevant influence on the processing quality. To the extent that only one input parameter is provided, it may be selected from the aforementioned. In principle, other parameters, such as for example the rotational speed of the corn cracker 5, may also be used as an input parameter that may also be fixedly coupled to the engine speed.

The output parameters may comprise machine parameters of the corn cracker 5 and/or the machine parameters influencing the processing quality. In one or some embodiments, the output parameters comprise any one, any combination, or all of: the gap width of the gap 7 of the corn cracker 5; the differential speed of the corn cracker 5; or the rotational speed of the corn cracker 5. To the extent that only one output parameter is provided, it may be selected from the aforementioned.

In one or some embodiments, the processing quality may be specified to depend on other variables. The specified processing quality may comprise a minimum processing quality to be achieved and a higher processing quality that may be desired that depends on agricultural considerations. Accordingly, the multidimensional characteristic map 11 may also represent a relationship between any one, any combination, or all of a driving speed of the forage harvester 1, an output per area of the forage harvester 1, or energy consumption (e.g., fuel consumption of the forage harvester 1) on the one hand and the at least three parameters on the other hand. This representation may be used for a provided multi-objective optimization.

The situation may be such that the driver assistance system 8 performs multi-objective optimization with several objectives based on the optimization model 10 in the control routine. Various multiple combinations of objectives are contemplated. For example, in multi-objective optimization, one objective may comprise the specified processing quality and one objective may comprise any one, any combination, or all of a minimum energy consumption, a maximum driving speed, or a maximum output per area. The driver assistance system 8 may determine the output parameter optimized based on multi-objective optimization in the control routine during the harvesting process based on the varying input parameter. In one or some embodiments, one objective in multi-objective optimization is the specified processing quality, and one objective is the maximum driving speed. In summary, using multi-objective optimization, it is contemplated to control the forage harvester 1 using the output parameter such that, on the one hand, a specified processing quality is achieved and, on the other hand, at least one additional objective is achieved, such as a maximum driving speed.

Figure 2:
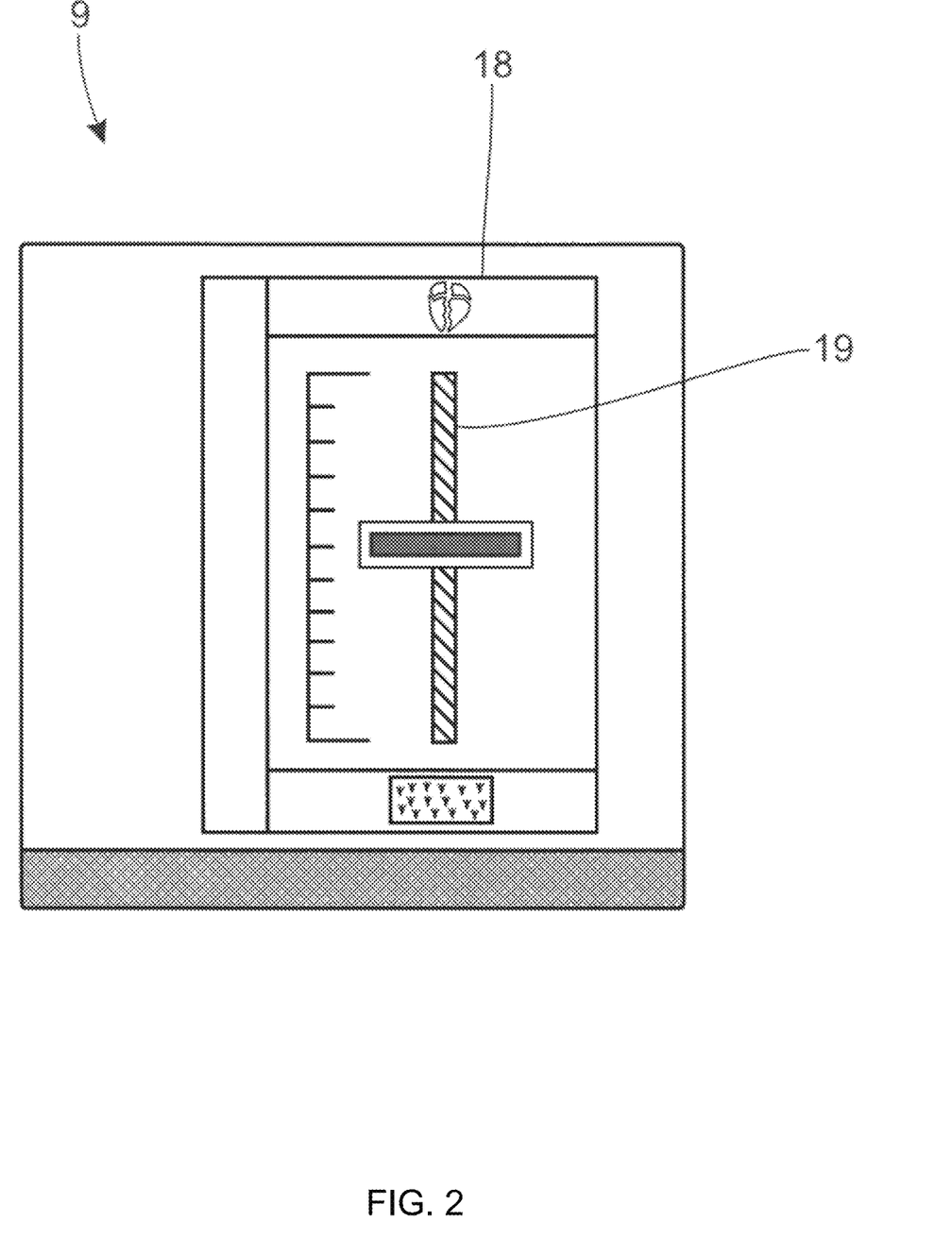
FIG. 2 illustrates a user interface for entering user instructions.

In one or some embodiments, the objectives of the multi-objective optimization are weighted. The weighting of the objectives, such as, for example, the specified processing quality and the minimum energy consumption, may be specified by a user B. In so doing, as shown in FIG. 2, the situation may be such that the user B may adjust the weighting between the processing quality, at the top in FIG. 2, and the minimum energy consumption, at the bottom in FIG. 2, to a graphic 18, such as a slider 19, and the graphic 18 visualizes competition between the processing quality and the minimum energy consumption. It may also be additionally provided that the user B may still specify a minimum value for the processing quality.

In one or some embodiments, instead of the objective of minimum energy consumption, any other objective may be specified by the user B and be included in the above visualization. This relates in particular to the maximum driving speed as well as all other objectives of multi-objective optimization noted above.

Generally, the user B may specify various additional user specifications for the forage harvester 1 in addition to the aforementioned user specifications while the forage harvester 1 is being controlled. It may happen that even small changes to these specifications may lead to much greater efficiency. It may therefore be the case that the driver assistance system 8, based on multi-objective optimization, makes suggestions to the user B with respect to any one, any combination, or all of the specified processing quality; the adjustment of machine parameters; or the weighting of the objectives with which objectives may be better achieved in multi-objective optimization. These small deviations may easily be analyzed by representing the interdependencies between the various parameters in the multidimensional characteristic map. It may therefore be the case that the suggestions by the driver assistance system 8 normally deviate from the user specifications. The user B may accept or reject the suggestions.

In one or some embodiments, the multidimensional characteristic map 11 has at least one two-dimensional characteristic 20 and/or at least one multidimensional (such as at least one three-dimensional; at least one four-dimensional; etc.) characteristic 21.

In one or some embodiments, at least some of the characteristics 20, 21 are based on measured relationships. In addition or alternatively, at least some of the characteristics 20, 21 are based on theoretical relationships. An individual characteristic 20, 21 may also contain combinations of measured theoretical relationships. To the extent the multidimensional characteristic map 11 comprises more than one characteristic 20, 21, they are correspondingly linked to form the multidimensional characteristic map 11. This linkage is indicated in FIG. 1 by the dashed line between the two-dimensional characteristic 20 and the multidimensional characteristic 21.

In one or some embodiments, at least some of the characteristics 20, 21 are based on relationships that the user B has measured at a location in the past relating to the current harvesting process. The situation may be such that some local conditions such as a topography, climate, etc. may have an influence on the essentials of the multidimensional characteristic map 11. This influence may accordingly be considered.

In one or some embodiments, the driver assistance system 8 adapts the multidimensional characteristic map 11 during the ongoing harvesting process, such as cyclically, to the current harvesting process state. This was discussed above. This may not expressly be a regulation in the truest sense. Instead, the basis for controlling the corn cracker 5 is changed. In a regulation, an attempt may be made to quickly readjust the desired value using feedback. Contrastingly in the present case, an attempt may be made to adapt the basis for controlling such that the desired value is correctly adjusted. However, the value adjusted in this manner is not readjusted.

In one or some embodiments, the driver assistance system 8 has at least one initial characteristic map and, in the first determination of the at least one output parameter, undertakes the determination based on the initial characteristic map. This initial characteristic map may, for example, be stored by the manufacturer.

In one or some embodiments, the multidimensional characteristic map 11 may represent at least one relationship between a control parameter representing the current harvesting process state and at least one of the at least three parameters. The driver assistance system 8 may adapt or modify the multidimensional characteristic map 11 to the current harvesting process state based on the relationship between the control parameters and the at least three parameters. In one or some embodiments, the driver assistance system 8 saves the adapted multidimensional characteristic map 11 for use in later harvesting processes. The control parameter may be various parameters that, for example, depend on the input parameters and the output parameters but however are not directly used to control the corn cracker 5. An attempt may then be made to predict the control parameters based on the optimization model 10 and to undertake an adaptation or a modification of the optimization model 10 when there is a deviation of the actual value of the control parameter from the prediction.

The driver assistance system 8 may redetermine the output parameter in the control routine and adjust it in the corn cracker 5 during the harvesting process at predetermined times (e.g., cyclically) and/or when there is a change, such as a specified deviation from the optimization model 10, in any one, any combination, or all of: the harvested material throughput; the motor rotational speed; the harvested material moisture; or the chaff length. In particular, one, some or each of the harvested material throughput, the motor rotational speed, the harvested material moisture, or the chaff length may have an associated specified optimization value. Responsive to deviations from the associated specified optimization value for one, some or each of the harvested material throughput, the motor rotational speed, the harvested material moisture, or the chaff length, the driver assistance system 8 may redetermine the output parameter in the control routine and adjust it in the corn cracker 5.

In one or some embodiments, a method for controlling a forage harvester 1 is disclosed. Reference is made to all statements regarding the disclosed forage harvester 1. In one or some embodiments, the driver assistance system 8 is configured to perform the control routine as described above.

Further, it is intended that the foregoing detailed description be understood as an illustration of selected forms that the invention can take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Forage harvester
2 Work assembly
3 Crop
4 Harvested material
5 Corn cracker
6 Roller of the corn cracker
7 Gap of the corn cracker
8 Driver assistance system
9 Terminal
10 Optimization model
11 Characteristic map
12 Pre-pressing rollers
13 Motor
14 Attachment
15 Cutter head
16 Moisture sensor
17 Throughput sensor
18 Graphic
19 Slider
20 Two-dimensional characteristic map
21 Multidimensional characteristic map
22 Processor
23 Memory
B User

The invention claimed is:

1. A forage harvester configured for one or both of performing a harvesting process with at least one work assembly for harvesting a crop or for processing harvested material of the crop in a context of the harvesting the process, wherein the harvested material comprises grain components, the forage harvester comprising:
a corn cracker configured to process the grain components to comminute the harvested material, the corn cracker including at least two rollers configured to rotate, wherein the at least two rollers including a gap with an adjustable gap width therebetween through which the harvested material is transported, wherein the corn cracker including machine parameters comprising the adjustable gap width and one or both of adjustable rotational speed of one or both of the at least two rollers or an adjustable differential rotational speed of the at least two rollers; and a driver assistance system configured to:
use an optimization model comprising at least one multidimensional characteristic map in order to control the corn cracker, the at least one multidimensional characteristic map representing a relationship between a processing quality of the grain components and at least three parameters, the at least three parameters comprising at least one input parameter and at least one output parameter, the at least one input parameter varying during the harvesting process and representing a current harvesting process state, the at least one output parameter comprising at least one of the machine parameters of the corn cracker;

determine, during the harvesting process and based on both the at least one input parameter and the optimization model comprising the at least one multidimensional characteristic map, a value of the at least one output parameter in order to achieve a uniform given processing quality of the grain components during the harvesting process; and cause adjustment of the at least one of the machine parameters of the corn cracker based on the value of the at least one output parameter in order to achieve the uniform given processing quality of the grain components during the harvesting process.

2. The forage harvester of claim 1, wherein the at least three parameters of the at least one multidimensional characteristic map comprise:
at least two input parameters representing the current harvesting processing state; and
at least two output parameters comprising at least two of the machine parameters.

3. The forage harvester of claim 1, wherein the at least three parameters of the at least one multidimensional characteristic map comprise:
at least two input parameters representing the current harvesting processing state; and
at least three output parameters comprising the adjustable gap width, the adjustable rotational speed of one or both of the at least two rollers; and the adjustable differential rotational speed of the at least two rollers.

4. The forage harvester of claim 1, further comprising at least one of:
pre-pressing rollers with an adjustable rotational speed through which a chaff length of the harvested material is adjusted;
a motor as a work assembly with an adjustable rotational speed for driving the forage harvester and for supplying energy to at least one other work assembly;
an attachment as a work assembly for picking up the crop;
a cutter head as a work assembly for chopping up the harvested material;
a moisture sensor for determining harvested material moisture; or
a throughput sensor for determining harvested material throughput; and
wherein the multidimensional characteristic map is configured as one or more input parameters or one or more output parameters for one or more of the adjustable rotational speed of the pre-pressing rollers, the adjustable rotational speed of the motor, the harvested material moisture, or the harvested material throughput.

5. The forage harvester of claim 1, wherein the input parameters comprise one or more of sensed harvested material parameters, chaff length, rotational speed of pre-pressing rollers, harvested material moisture, motor rotational speed, or harvested material throughput.

6. The forage harvester of claim 1, wherein the multidimensional characteristic map further represents a relationship between a driving speed of the forage harvester and between one or both of an output per area of the forage harvester or energy consumption of the forage harvester and the machine parameters;
wherein the driver assistance system is configured to perform multi-objective optimization with multiple objectives;
wherein the multiple objectives are selected from processing quality, minimum energy consumption, maximum driving speed, or maximum output per area; and
wherein the driver assistance system is configured to determine the at least one output parameter optimized based on the multi-objective optimization with the multiple objectives.

7. The forage harvester of claim 6, wherein the driver assistance system is further configured to receive weighting from a user; and
wherein the driver assistance system is configured to perform the multi-objective optimization by the weighting the multiple objectives.

8. The forage harvester of claim 7, wherein the driver assistance system is further configured to output a graphic indicative of interplay between the multiple objectives; and
wherein the driver assistance system is configured to receive the weighting from the user via user input to the graphic.

9. The forage harvester of claim 8, wherein the driver assistance system, based on multi-objective optimization, is configured to output one or more suggestions to the user with respect to the multiple objectives along with the graphic indicative of the interplay between the multiple objectives.

10. The forage harvester of claim 9, wherein the driver assistance system is further configured to output suggested weighting of the multiple objectives through which to better achieve the multiple objectives in the multi-objective optimization.

11. The forage harvester of claim 1, wherein the multidimensional characteristic map has at least one two-dimensional characteristic;
wherein at least some of the characteristics in the multidimensional characteristic map are based on measured relationships;
wherein at least other the characteristics in the multidimensional characteristic map are based on theoretical relationships,
wherein the harvesting process comprises a current harvesting process; and
wherein at least some of the characteristics in the multidimensional characteristic map are based on relationships that a user has previously measured at a location relating to the current harvesting process.

12. The forage harvester of claim 1, wherein the driver assistance system is further configured to:
determine whether there is a specified deviation in one or more of harvested material throughput, motor rotational speed, harvested material moisture, or chaff length from values generated by an optimization model; and responsive to determining that there is the specified deviation, redetermine the at least one output parameter in a control routine of the driver assistance system and adjust it in the corn cracker during the harvesting process.

13. The forage harvester of claim 1, wherein the driver assistance system is further configured to adapt the at least one multidimensional characteristic map to the current harvesting process state.

14. The forage harvester of claim 13, wherein the driver assistance system is configured to adapt the at least one multidimensional characteristic map from at least one initial characteristic map using the at least one output parameter generated by the at least one initial characteristic map.

15. A forage harvester configured for one or both of performing a harvesting process with at least one work assembly for harvesting a crop or for processing harvested material of the crop in a context of the harvesting the process, wherein the harvested material comprises grain components, the forage harvester comprising:

a corn cracker configured to process the grain components to comminute the harvested material, the corn cracker including at least two rollers configured to rotate, wherein the at least two rollers including a gap with an adjustable gap width therebetween through which the harvested material is transported, wherein the corn cracker including machine parameters comprising the adjustable gap width and one or both of adjustable rotational speed of one or both of the at least two rollers or an adjustable differential rotational speed of the at least two rollers; and a driver assistance system configured to:
use at least one multidimensional characteristic map in order to control the corn cracker, the at least one multidimensional characteristic map representing a relationship between a processing quality of the grain components and at least three parameters, the at least three parameters comprising at least one input parameter and at least one output parameter, the at least one input parameter varying during the harvesting process and representing a current harvesting process state, the at least one output parameter comprising at least one of the machine parameters of the corn cracker;

determine, during the harvesting process and based on both the at least one input parameter and the at least one multidimensional characteristic map, a value of the at least one output parameter in order to achieve a uniform given processing quality of the grain components during the harvesting process;

cause adjustment of the at least one of the machine parameters of the corn cracker based on the value of the at least one output parameter in order to achieve the uniform given processing quality of the grain components during the harvesting process;

adapt the multidimensional characteristic map during the harvesting process to the current harvesting process state; and generate, using at least one initial characteristic map, at least one output parameter; and wherein the driver assistance system is configured to adapt the multidimensional characteristic map from at least one initial characteristic map using the at least one output parameter generated by the at least one initial characteristic map.

16. The forage harvester of claim 15, wherein the multidimensional characteristic map represents at least one relationship between a control parameter representing the current harvesting process state and at least one of the at least three parameters; and wherein the driver assistance system is configured to adapt the multidimensional characteristic map to the current harvesting process state based on the at least one relationship between the control parameter and the at least one of the at least three parameters.

17. A method for controlling a forage harvester comprising:

using an optimization model comprising at least one multidimensional characteristic map in order to control a corn cracker, the corn cracker processing grain components to comminute harvested material, the corn cracker including at least two rollers configured to rotate, the at least two rollers including a gap with an adjustable gap width therebetween through which the harvested material is transported, the corn cracker including machine parameters comprising the adjustable gap width and one or both of adjustable rotational speed of one or both of the at least two rollers or an adjustable differential rotational speed of the at least two rollers, the at least one multidimensional characteristic map representing a relationship between a processing quality of the grain components and at least three parameters, the at least three parameters comprising at least one input parameter and at least one output parameter, the at least one input parameter varying during a harvesting process and representing a current harvesting process state, the at least one output parameter comprising at least one of the machine parameters of the corn cracker;

determining, during a harvesting process and based on both the at least one input parameter and the optimization model comprising the at least one multidimensional characteristic map, a value of the at least one output parameter in order to achieve a uniform given processing quality of the grain components during the harvesting process; and causing the adjustment of the at least one of the machine parameters of the corn cracker based on the value of the at least one output parameter in order to achieve the uniform given processing quality of the grain components during the harvesting process.

18. The method of claim 17, wherein the at least three parameters of the at least one multidimensional characteristic map comprise:

at least two input parameters representing the current harvesting processing state; and at least two output parameters comprising at least two of the machine parameters.

19. The method of claim 17, wherein the at least three parameters of the at least one multidimensional characteristic map comprise:

at least two input parameters representing the current harvesting processing state; and at least three output parameters comprising the adjustable gap width, the adjustable rotational speed of one or both of the at least two rollers; and the adjustable differential rotational speed of the at least two rollers.

20. The method of claim 17, wherein the input parameters comprise one or more of sensed harvested material parameters, chaff length, rotational speed of pre-pressing rollers, harvested material moisture, motor rotational speed, or harvested material throughput.

* * * * *